United States Patent [19]
Mair

[11] Patent Number: 5,183,304
[45] Date of Patent: * Feb. 2, 1993

[54] APPARATUS AND METHOD FOR GRASPING AND STABLY LIFTING LIDS HAVING A HANDLE

[76] Inventor: Billie J. Mair, P.O. Box 160, Midway, Utah 84049

[*] Notice: The portion of the term of this patent subsequent to Dec. 10, 2009 has been disclaimed.

[21] Appl. No.: 804,082

[22] Filed: Dec. 6, 1991

Related U.S. Application Data

[63] Continuation-in-part of Ser. No. 567,296, Aug. 14, 1990, Pat. No. 5,071,182.

[51] Int. Cl.⁵ ............................................. A47J 45/10
[52] U.S. Cl. ....................................... 294/10; 294/12; 294/24
[58] Field of Search ........................ 294/2, 3, 9–16, 294/19.1, 22, 24, 26, 27.1, 34, 103.1; 16/110 A, 114 R, 114 A, 116 R, 124

[56] References Cited

U.S. PATENT DOCUMENTS

| | | | |
|---|---|---|---|
| D. 237,247 | 10/1975 | Nockleby | 294/19.1 X |
| 416,063 | 11/1889 | Kendrick | 294/13 |
| 554,150 | 2/1896 | Smith | 294/12 X |
| 627,668 | 6/1899 | Holt | 294/10 |
| 1,166,301 | 12/1915 | Yoho | 294/12 |
| 1,533,726 | 4/1925 | Davis | 294/13 |
| 1,722,953 | 7/1929 | Cole | 294/10 |
| 1,820,463 | 8/1931 | Klein | 294/11 |
| 1,976,977 | 10/1934 | Zinky | 294/11 |
| 2,125,214 | 7/1938 | Apfel et al. | 294/11 |
| 2,358,565 | 9/1944 | Dunlap | 294/34 |
| 2,429,046 | 10/1947 | Billig | 294/11 |
| 2,992,848 | 7/1961 | Livensparger | 294/34 |
| 3,118,697 | 1/1964 | Watters | 294/11 |
| 4,105,238 | 8/1978 | Stright | 294/11 |
| 4,222,599 | 9/1980 | Gale et al. | 294/12 |
| 4,601,505 | 7/1986 | Chilton | 294/26 |
| 4,832,389 | 5/1989 | Orton | 294/12 X |
| 4,903,683 | 2/1990 | Larsen et al. | 294/10 X |
| 5,071,182 | 12/1991 | Mair | 294/12 |

Primary Examiner—Johnny D. Cherry
Attorney, Agent, or Firm—Trask, Britt & Rossa

[57] ABSTRACT

An apparatus and method for grasping and lifting a lid having a handle and for lifting the vessel with which the lid is associated is disclosed. The apparatus is particularly directed to use with Dutch ovens and includes two elongated rods conjoined together, one rod being adjustably coupled with the other rod, and each rod having a handle for grasping formed at one end. One rod has a hook formed at the end thereof opposite the handle, and the other rod has stabilizing structure attached to the end thereof opposite the handle. As the user grasps the handles of the two rods in his hand and brings the handles together, the hook engaged to the handle of the lid raises the lid slightly until the lid contacts the stabilizing structure. The lid is thereby securely held between the hook and the stabilizing structure and is prevented from wobbling. The invention facilitates the lifting of a lid from a Dutch oven, the lid typically being loaded with hot coals, and stabilizes the lid so that coals and ashes therefrom do not fall into the Dutch oven containing food. The invention further includes grasping structure for engaging the bail of the vessel or Dutch oven for lifting it from the ground.

12 Claims, 4 Drawing Sheets

APPARATUS AND METHOD FOR GRASPING AND STABLY LIFTING LIDS HAVING A HANDLE

BACKGROUND

Related Applications

This is a continuation-in-part of the application bearing Ser. No. 07/567,296 filed Aug. 14, 1990, now issued as U.S. Pat. No. 5,071,182 dated Dec. 10, 1991.

1. Field of Invention

This invention relates generally to devices designed for grasping and removing lids from pots, said pots typically being of the culinary type. In particular, the invention relates to devices for grasping and stably removing the lid of a Dutch oven.

2. Statement of the Art

Different methods of cooking meals in the outdoors have been developed recently in response to the increased interest in outdoor activities, such as camping. To outdoor enthusiasts, one of the most satisfying cooking methods is cooking in a Dutch oven. Dutch ovens are heavy cast iron kettles typically having a plurality of legs located in proximity to the bottom of the pot, a movable handle or bail, and a lid having a graspable handle constructed to receive cooking coals thereon.

In use, Dutch ovens are first filled with a food substance for cooking. Such food substances might range from a stew, to a batter for bread, to a standing rib roast. Some form of heating material is then prepared. Usually the heating material is charcoal, commercially manufactured charcoal briquettes, or heated wood. The heating material is prepared by establishing a fire and heating the charcoal, briquettes, or wood therein until the material is increased sufficiently in temperature to radiate heat therefrom. Once the heating material is sufficiently hot, it is placed about the bottom of the Dutch oven and in the recessed lid of the Dutch oven. The Dutch oven is maintained in contact with the heating material until the food substance inside the pot is done cooking. Depending upon the particular food item, the cooking process may take from between less than an hour to several hours.

During the cooking process, it is frequently necessary to remove the lid from the Dutch oven to check the progress of the cooking process and to remove and replace the spent heating material on the lid so that the cooking process may continue. It is also necessary from time to time to remove the Dutch oven from the heating material on which it is positioned in order to replace the spent heating material so that cooking may continue. It is desirable that when the lid is removed from the Dutch oven, ashes and charcoal or wood do not fall into the food.

Many devices and methods have been improvised for removing the lid from a Dutch oven. In addition, a number of devices have been commercially developed for removing the lid. Both improvised and commercially developed devices have proven unsatisfactory in removing the lid because they are incapable of stabilizing the lid. Ashes and other heating material are too frequently dropped into the food as a result. By way of improvisation, people have used pliers, the claw of a hammer, and garden implements such as hoes, pitch forks, shovels, and/or the handles of such items. In turn, each of these improvised devices have proven to be inadequate in removing the lid of a Dutch oven. In particular, pliers, used to grasp the handle of the lid, tend to nick and mar the metal of the handle leading to a weakening in the iron. Pliers are also unstable because they only allow a two-point contact with the lid handle and ashes are therefore frequently dropped into the food. Similarly, using the claw of a hammer allows the lid to wobble thereby dropping ashes into the food. And, like pliers, the use of a hammer causes the user's hand grasping the hammer to get too close to the heating material on the lid making removal of the lid difficult and painful. The use of garden implements presents the same difficulties of instability and the potential for burning the handle of the garden implement.

Commercially developed devices for removing the lid of Dutch ovens include hooking devices and grasping devices. Some of these devices have extended handles on them in order to distance the user from the heating material on the lid of the Dutch oven. However, no device presents an adequate means for stabilizing the lid while it is being removed from the pot. Some devices have added a member, such as a peg, in proximity to the hook or grasping means in order to stabilize the lifting of the lid from the pot relative to the hooking or grasping means. However, these devices do not limit the lateral movement of the lid, and heating material is often dropped into the food.

SUMMARY OF THE INVENTION

The invention herein presents a novel means of stably removing the lid of a Dutch oven so that ashes, coals or other heating materials do not fall into the pot as the lid is being removed. The invention generally includes two elongated rods conjoined together, one rod being slidably adjustable in relation to the other. Both rods have means for grasping by the user, said grasping means being attached or formed to the upper end of the rods. One rod has formed, at the end of the rod opposite the grasping means, a means for stabilizing the lid which contacts the lid of the Dutch oven during the removal process. The means for stabilizing the lid may be a plurality of leg members, not numbering less than three, which are substantially evenly spaced apart from each other in order to eliminate any movement or rotation of the lid. The other rod has formed, at the end of the rod opposite to the grasping means, an arcuately shaped hook for engaging the handle of the lid. The invention further includes grasping structure for engaging the bail of a Dutch oven so that it may be lifted from the ground or fire.

To remove the lid from the Dutch oven, the hooked rod is lowered in relation to the stabilizing rod, and the handle of the lid is positioned in the hook of the rod. The grasping means of the hooked rod is then brought in close proximity to the grasping means of the stabilizing rod, thereby raising the lid slightly until the lid contacts the means for stabilizing the lid. The lid is held securely between the hook and means for stabilizing the lid and may be removed from the Dutch oven without any oscillation or movement of the lid.

In an alternative embodiment, the stabilizing rod may further comprise a ring attached to leg members for further stability of the lid. In another alternative embodiment, the invention may further comprise a resilient spring mechanism associated with the device for maintaining a set distance between the hooked rod and the stabilizing rod, such that when the grasping means of the rods are brought together by the clenching of the user's hand, the spring mechanism is compressed, and when the user relaxes his hand, the spring forces the grasping means apart again.

The invention allows the user to firmly grasp the lid and raise it from its horizontal orientation relative to the Dutch oven to a vertical position, thereby allowing ashes and spent heating materials to be shaken off. It is obviously undesirable to grasp the lid of the Dutch oven with a bare hand since it will be very hot. Therefore, the present invention allows quick removal of the lid from the Dutch oven and easy unloading of materials from the lid without having to touch the lid with a hand. With other lifting devices, the lid cannot be readily emptied of spent heating materials without grasping the lid with either another device or with a gloved hand.

The invention presents a number of improved features over prior art devices. That is, in addition to stabilizing the lid so that ashes and heating materials will not be spilled in the pot, the invention has an elongated rod construction which allows removal of the lid while maintaining a distance between the user and the hot material resting on the lid. Consequently, the user will not be burned by getting too close to the heating materials on the lid. Since Dutch oven cooking takes place at ground level, the elongated rods also allow the user to remove the lid from the oven while remaining in a standing position. This feature is quite advantageous since it may be inconvenient or physically difficult to bend over to reach the Dutch oven.

The invention is also constructed of strong metal material which allows lifting of the lid or lifting of the entire Dutch oven by the bail without distorting the metal of the invention. Users also find that the elongated rod construction of the device makes lifting the entire Dutch oven much easier. That is, the entire Dutch oven can be lifted from the ground by grasping the bail attached to the body of the Dutch oven with the hooked rod. Alternatively, grasping structure associated with the invention may be used to engage the bail to lift the Dutch oven. Large cast iron Dutch ovens which are full of food can weigh up to 100 pounds. Therefore, the elongated rod construction and sturdy structural strength of the device allows the user to pick up the Dutch oven without bending over, thus eliminating strain on the user's back.

The construction of the invention allows the device to stand upright by itself. As a result, the user may place the invention near the Dutch oven, in an upright position, and the user will not have to bend over to pick the invention up to use it. Also, the invention remains in plain sight and near its area of use, unlike other devices which may have to be placed at a distance from the Dutch oven for storage until the moment of using it again. Additionally, the construction of the grasping means of the rods allows the device to be hung from or rested on any ledge, such as the edge of a table, a tree branch, or the like.

These features and others are more fully illustrated by the drawings and description below.

DETAILED DESCRIPTION OF THE PREFERRED EMBODIMENTS

Figure 1:
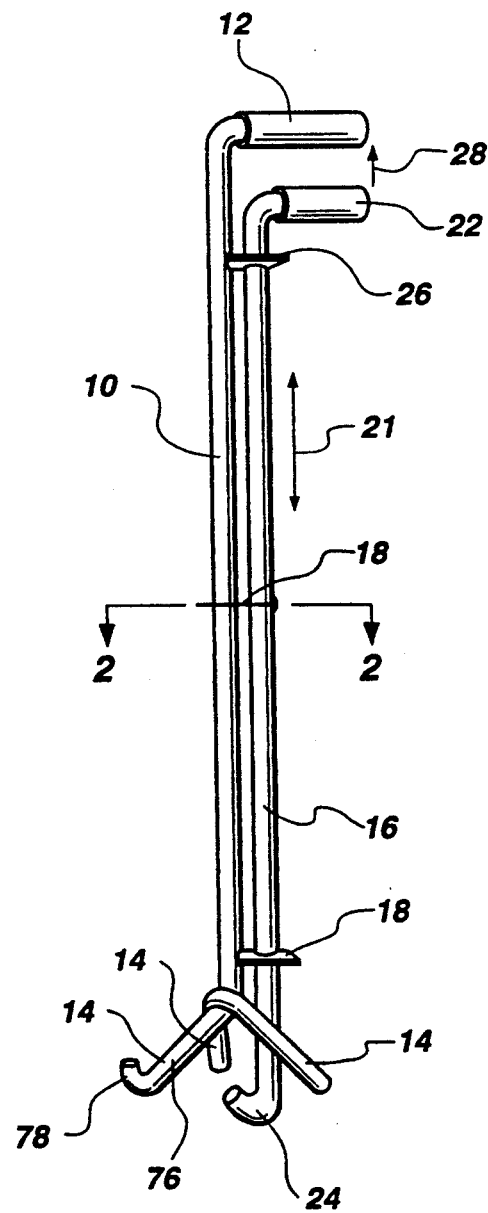
FIG. 1 is a perspective view of the invention.

The invention disclosed herein provides a novel means for removing the lid from a cooking pot, such as a Dutch oven. As illustrated in FIG. 1, the invention generally includes a first rod 10 having a means for grasping, such as a handle 12, formed at one end thereof. The handle 12 may be integrally formed with the first rod member 10, as illustrated in FIG. 1, or the handle may be detachably attached to the first rod member. The handle 12 may be covered with a conforming, grippable material, such as rubber or plastic.

The first rod member 10 has formed at the end opposite the handle a means for stabilizing the lid. The means for stabilizing the lid may be a plurality of stabilizing members, or leg members 14, as illustrated in FIG. 1. The legs members 14 should number at least three, but may be any greater number. The number of leg members may not be less than three since less than three leg members would not provide the necessary stability for removing the lid.

Figure 2:
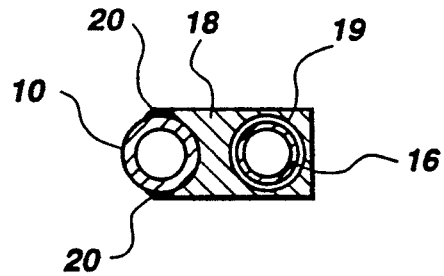
FIG. 2 is a cross-sectional view of the invention illustrated in FIG. 1, taken at line 2—2.
Figure 3:
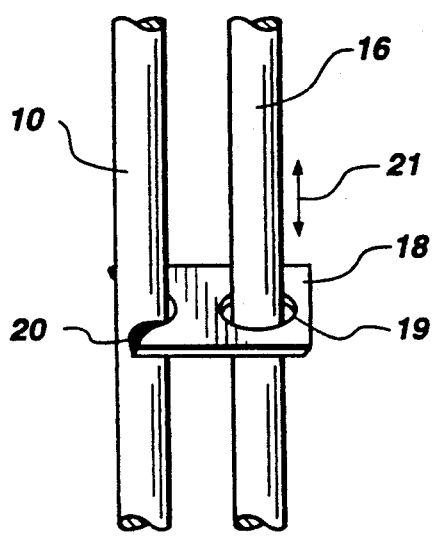
FIG. 3 is an enlarged perspective view of a portion of the invention illustrated in FIG. 2.

A second rod member 16 is positioned in close proximity to the first rod member 10 and is in parallel orientation thereto. The first rod member 10 and the second rod member 16 are maintained in close proximity to each other by coupling means 18. The coupling means 18 generally is attached to one of the rod members 10 or 16. The coupling means 18 may be a single member or a plurality of such coupling members as shown in FIG. 1. Each coupling means 18 has an aperture 19 or void formed therein for receiving the other rod member. In a preferred embodiment, as illustrated in FIGS. 1, 2, and 3, the coupling means 18 may be a flattened disk of metal affixed to one of the rod members 10 and 16. As illustrated in FIG. 2, the coupling means 18 is attached to the first rod member 10 by welding means 20. The coupling means 18 has formed therein an aperture 19 through which the second rod member 16 may be received. In FIG. 3 it can be seen that the positioning of the second rod member 16 within the aperture 19 of coupling means 18 allows the second rod member 16 to slide up and down, as indicated by arrow 21, relative to the first rod member 10.

Referring again to FIG. 1, the second rod member 16 is slidably disposed within the apertures of the coupling means 18, and the second rod member 16 may therefore move in a vertical direction, as shown by arrow 21, relative to the first rod member 10. The second rod member 16 has a means for grasping, such as a handle 22. Similar to the handle 12 of the first rod member 10, the handle 22 of the second rod member 16 may be integrally formed therewith or may be detachably attached to the second rod member 16, and the handle 22 may be covered with a grippable material such as plastic or rubber.

The second rod member 16 has formed at the end opposite the handle 22 an arcuate shaped hook 24. The hook 24 curves inwardly so as to be oriented beneath the first rod member 10 and substantially centered within the stabilizing means or legs 14.

Gravity acting upon the invention causes the second rod member 16 to slide downwardly relative to the first rod member 10 thereby causing the handle 12 of the first rod member 10 to be spaced apart from the handle 22 of the second rod member 16. The upper coupling means 26, by contacting the handle 22 of the second rod member 16, prevents the handle 22 of the second rod member 16 from dropping more than a specified distance from the handle 12 of the first rod member 10. That specified distance is generally the average span between the fingers and thumb of a user. In operation, therefore, the user positions his fingers about the handle 22 of the second rod member 16 and places his thumb on top of the handle 12 of the first rod member 10 and brings his fingers in proximity to his thumb. By so doing, handle 22 is forced toward handle 12 in the direction of arrow 28, and the hook 24 is thereby raised upwardly to come into closer proximity with the stabilizing means, or legs 14, of the first rod member 10.

Figure 4:
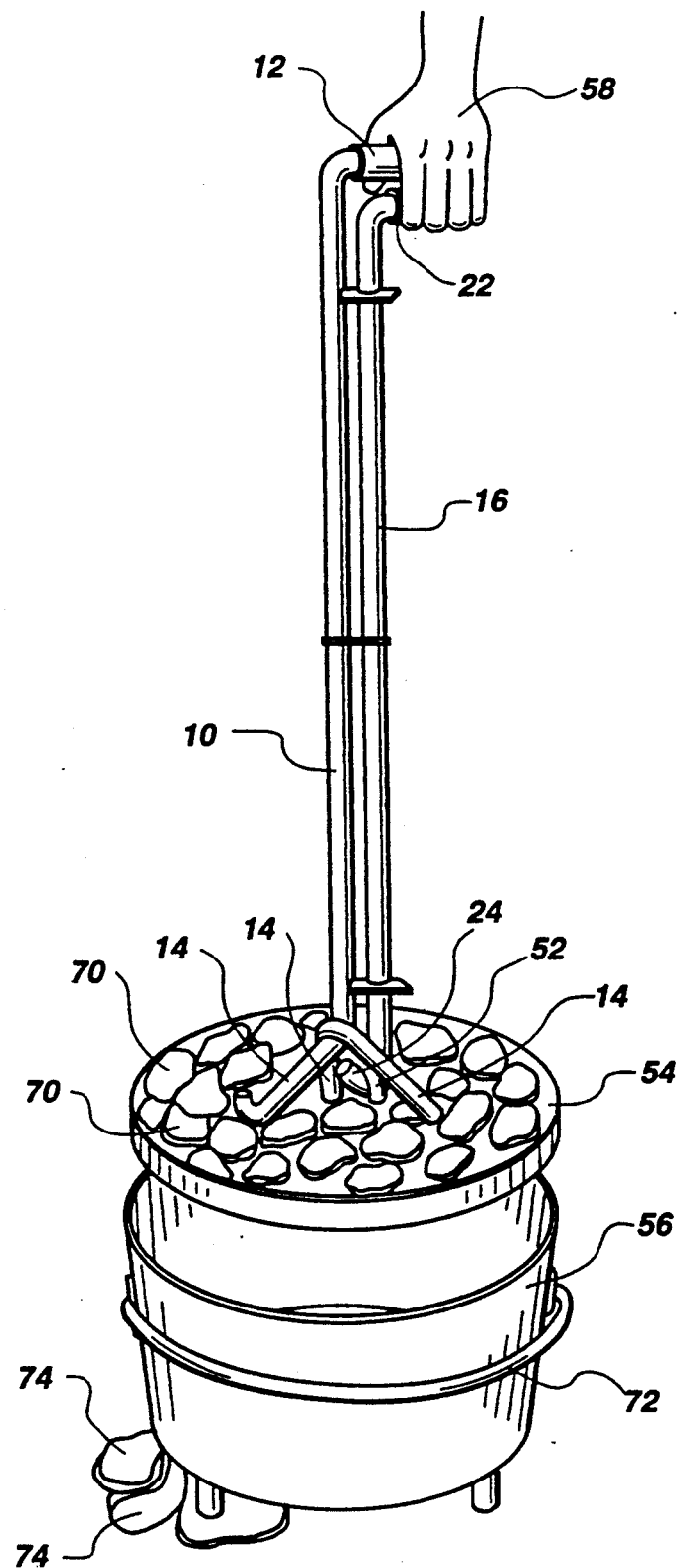
FIG. 4 is a perspective view illustrating the invention in use.

Operation of the device is more clearly illustrated in FIG. 4 in which it can be seen that the hook 24 has engaged the handle 52 attached to the lid 54 of the Dutch oven 56. The user grips the handle 12 of the first rod member 10 and the handle 22 of the second rod member 16 in his hand 58 and clenches his fingers and thumb together. By clenching of the user's first, the second rod member 16 is raised upwardly in relation to the first rod member 10, and the hook 24 raises the lid 54 slightly until the leg members 14 contact the lid 54. The lid 54 may then be lifted completely from the Dutch oven 56 without dislodging or spilling any of the heating materials 70 which are atop the lid 54. While still grasping the handles 12 and 22, the user may shake the spent heating materials 70 and ash from the lid 54 and place the lid back on the Dutch oven 56. The hook 24 of the device can also be used to engage the movable handle or bail 72 of the Dutch oven 56 so that the entire Dutch oven can be lifted from the surrounding heating materials 74.

Figure 5:
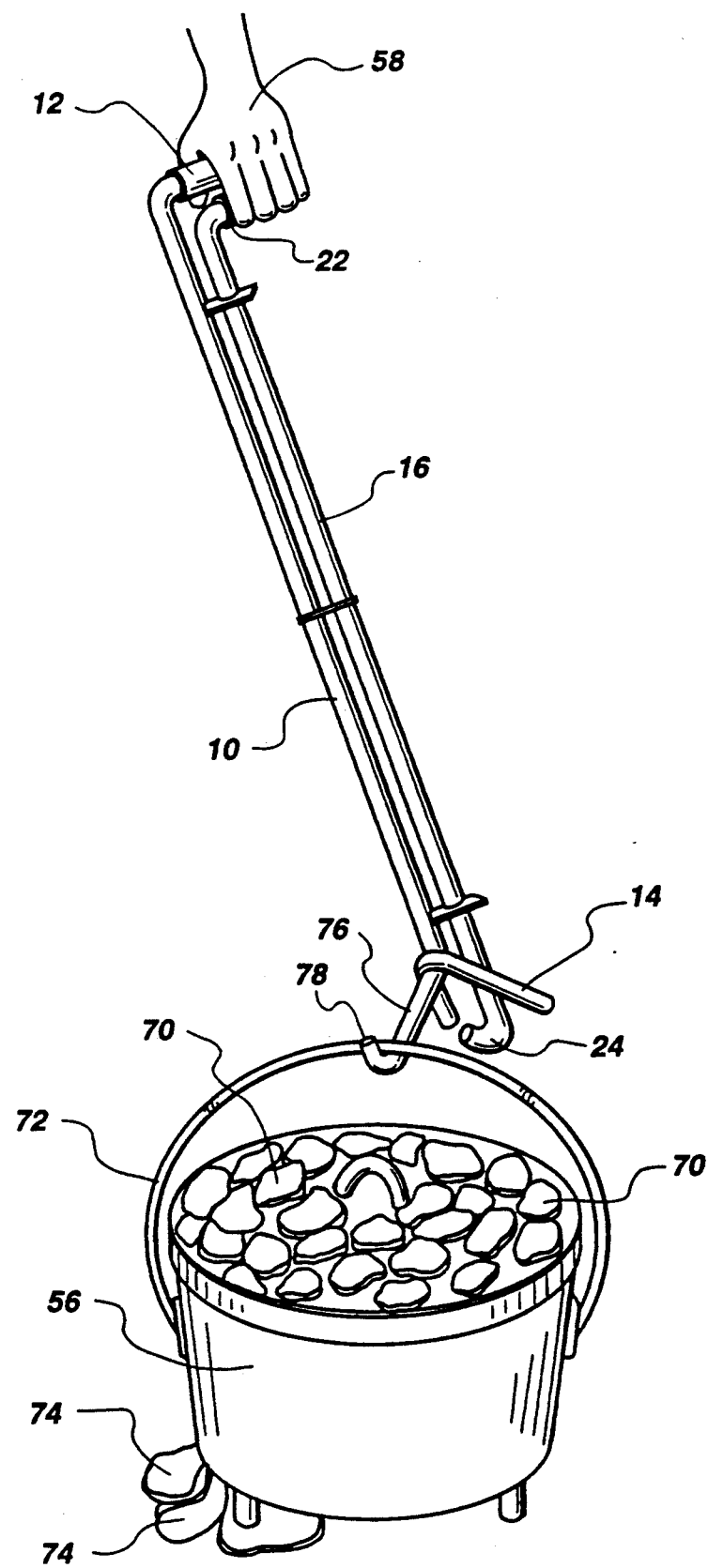
FIG. 5 is a perspective view illustrating use of the invention to lift the bail of the Dutch oven.

Alternatively, grasping structure may be associated with the invention to facilitate engagement of the bail and movement of the Dutch oven. An example of such grasping structure is illustrated in FIGS. 1, 4, 5, and 6 where the forward leg member 76 is curved at the end thereof to form a second hook 78. As illustrated in FIG. 5, the second hook 78 may be used to secure the bail 72 and lift the Dutch oven from the heating materials 74 surrounding it. The grasping structure, such as second hook 78, is particularly advantageous for engaging the bail 72 since it is unencumbered by other elements of the invention. Understandably, the grasping structure or second hook 78 may be formed to the end of any one of the leg members 14. Further, the grasping structure may be associated with the stabilizing or first rod 10, or may alternatively be associated with the second rod 16.

The invention can be made of any sturdy material which is structurally strong and which maintains its shape and strength with heating. A preferred material for construction is cast iron or heavy steel.

Figure 6:
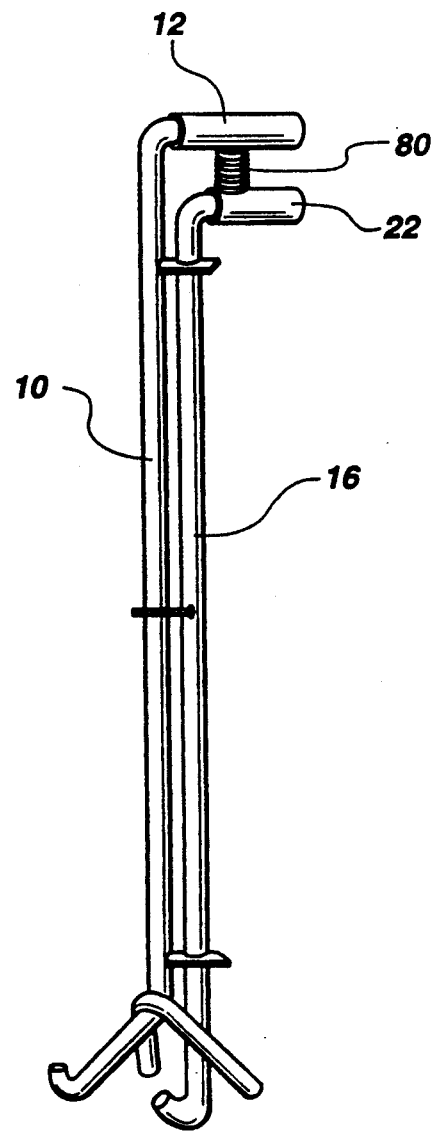
FIG. 6 is a perspective view of an alternative embodiment of the invention.

In an alternative embodiment, as shown in FIG. 6 a resilient spring 80 may be associated with the invention for forcing the handle 12 of the first rod member 10 apart from the handle 22 of the second rod member 16. Thus, in operation, when the user positions his hand about the two handles 12 and 22, as described above, the spring 80 is compressed. When the user relaxes his grip about the handles 12 and 22, the handles are forced apart again. Any similar movement means may be used to facilitate reciprocal movement of the first rod 10 and second rod 16 relative to each other.

The descriptions hereinabove are by way of illustration only and are not intended to limit the scope of the invention as set forth in the claims below.

What is claimed is:

1. An apparatus for grasping and lifting a cooking vessel having a cover with a handle and a bail comprising:
   a first rod member having a first end and a second end, said first rod member having a handle for grasping formed at said first end;
   a second rod member having a first end and a second end, said second rod member having a handle for grasping formed at said first end and an arcuately shaped hook formed at said second end;
   means for conjoining said first rod member to said second rod member such that said second rod member is slidably adjustable in orientation to said first rod member;
   means for stabilizing said cover, said means having contact means for contacting said cover at at least three points on said cover, said means for stabilizing being positioned proximate said second end of said first rod member and said contact means being extendable beyond said hook; and
   grasping structure associated with said second end of one of said rod members for engaging the bail of a cooking vessel.

2. The apparatus of claim 1 wherein said means for stabilizing said cover comprises at least three leg members.

3. The apparatus of claim 2 wherein said leg members are evenly spaced apart from each other.

4. The apparatus of claim 3 wherein said handle for grasping said first rod member and said handle for grasping said second rod member are each encased by a grippable covering.

5. The apparatus of claim 2 wherein said grasping structure is a second hook formed to one of said leg members.

6. The apparatus of claim 5 wherein said second hook is formed to a leg which is oriented in a direction opposite to said handles.

7. The apparatus of claim 2 wherein said grasping structure is a second hook secured to said first rod member proximate said second end.

8. The apparatus of claim 1 in which said means for conjoining said first rod member and said second rod member comprises at least one coupling member secured to one of said rod members, said coupling member having an aperture formed therein sized for receiving the other of said rod members and allowing slidable displacement of the other of said rod members therethrough.

9. The apparatus of claim 1 further comprising resilient means interconnected between said first rod member and said second rod member for facilitating said adjustability of said second rod member.

10. An apparatus for grasping and lifting a cover having a handle from a vessel having a bail comprising:
    a first elongated rod member having a first end and a second end, said first rod member having a handle for grasping formed at said first end;
    a second elongated rod member having a first end and a second end, said second rod member having a handle for grasping formed at said first end and an arcuately shaped hook formed at said second end;
    coupling means for conjoining said first rod member and said second rod member, said coupling means being secured to one said rod member and having an aperture formed therein sized for receiving the other said rod member, said other rod member being positioned within said aperture of said coupling means such that said other rod member is adjustable in orientation to said rod member to which said coupling means is secured;

means for stabilizing said cover, said means for stabilizing having contact means for contacting said cover comprising at least three leg members positioned proximate said second end of said first rod member, each said leg member being evenly spaced apart from each other; and grasping structure associated with said means for stabilizing for engaging the bail of a vessel.

11. The apparatus of claim 10 wherein said grasping structure is a second hook formed to one of said leg members.

12. A method of grasping and lifting a vessel having a bail and a cover having a handle comprising:

obtaining an apparatus for lifting a cover having a handle, said apparatus comprising first and second rod members coupled one to the other and being slidably adjustable relative to each other, first handle means associated with said first rod member and second handle means associated with said second rod member, means associated with said second rod member for stabilizing said cover, said means for stabilizing having contact means for contacting said cover at at least three points, hook means associated with said first rod member for engaging said handle of said cover, and grasping structure for engaging the bail of said vessel;

grasping said first handle and said second handle in a hand;

engaging said bail of said vessel with said grasping structure;

lifting said hand to raise said first and second rod members and said grasping structure to raise said bail above said vessel; and raising said hand to lift said vessel a selected distance.

* * * * *